US007003415B2

(12) United States Patent
Jitsukawa et al.

(10) Patent No.: US 7,003,415 B2
(45) Date of Patent: Feb. 21, 2006

(54) DELAY PROFILE ESTIMATION APPARATUS AND A CORRELATING UNIT

(75) Inventors: Daisuke Jitsukawa, Kawasaki (JP); Hiroyuki Seki, Kawasaki (JP); Yoshinori Tanaka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/020,417

(22) Filed: Dec. 27, 2004

(65) Prior Publication Data
US 2005/0107969 A1 May 19, 2005

Related U.S. Application Data

(63) Continuation of application No. PCT/JP02/12459, filed on Nov. 28, 2002.

(51) Int. Cl.
*G01R 23/16* (2006.01)

(52) U.S. Cl. .......................... 702/77; 455/18; 375/343
(58) Field of Classification Search ............ 702/75–77, 702/189, 190; 342/196; 455/18, 25, 226.1, 455/269, 334; 375/224, 260, 295, 343
See application file for complete search history.

(56) References Cited

U.S. PATENT DOCUMENTS

| 5,307,376 | A | * | 4/1994 | Castelain et al. | ........... 375/260 |
| 5,307,379 | A | * | 4/1994 | Bergstrom et al. | ........... 375/317 |
| 6,061,553 | A | * | 5/2000 | Matsuoka et al. | ........... 455/273 |
| 6,831,956 | B1 | * | 12/2004 | Schmidl et al. | ............. 375/343 |
| 2001/0053143 | A1 | * | 12/2001 | Li et al. | ..................... 370/344 |

FOREIGN PATENT DOCUMENTS

| JP | 5-75568 | 3/1993 |
| JP | 2000-59332 | 2/2000 |
| JP | 2000-134176 | 5/2000 |
| JP | 2000-22657 | 10/2000 |
| JP | 2001-292125 | 10/2001 |

OTHER PUBLICATIONS

"A Timing Synchronization Scheme for OFDM in Frequency Selective Fading Environment", Akinori Taira et al., The Transactions of the Institute of Electronics, Information and Communication Engineers, vol. J84-B, Jul. 1, 2001, pp. 1255-1264.
Akinori Taira, et al., "A Timing Synchronization Scheme for OFDM in Frequency Selective Fading Environment," The Institute of Electronics, Information and Communication Engineers, vol. J84-B, No. 7, pp. 1255-1264, Jul. 2001.

* cited by examiner

*Primary Examiner*—Marc S. Hoff
*Assistant Examiner*—Mary Catherine Baran
(74) *Attorney, Agent, or Firm*—Staas & Halsey LLP

(57) ABSTRACT

A delay profile estimation apparatus and a correlating unit to obtain delay profile with suppressed noise are disclosed. The delay profile estimation apparatus includes a receiving unit to receive a communication signal (received signal), a conversion unit to inverse-Fourier-transform a known pilot signal that consists of N samples, a correlating unit to obtain a correlation value between the inverse-Fourier-transformed known pilot signal and the received signal, the correlating unit being connected to the receiving unit and the conversion unit, and a delay profile generating unit for generating a delay profile of the received signal based on the correlation value. The correlating unit cyclically shifts N samples of the received signal, or the N samples of the known pilot signal when calculating the correlation value corresponding to a phase difference between the inverse-Fourier-transformed known pilot signal and the received signal.

11 Claims, 6 Drawing Sheets

DELAY PROFILE ESTIMATION APPARATUS AND A CORRELATING UNIT

CROSS-REFERENCE TO RELATED APPLICATION

This application is a U.S. continuation application filed under 35 USC 111(a) claiming benefit under 35 USC 120 and 365(c) of PCT International Application No. PCT/JP02/12459 filed on Nov. 28, 2002, which is hereby incorporated herein by reference.

TECHNICAL FIELD

The present invention relates to an apparatus configured to estimate a delay profile of a received signal, and a correlating unit thereof.

BACKGROUND TECHNOLOGY

Generally, in a mobile communications environment, a signal transmitted from a transmitter is reflected by obstacles such as the ground and buildings, and reaches a receiver through two or more propagation paths. Accordingly, it is important that good communication quality be available even if such multi-path propagations are present. A multi-carrier transmission system is considered appropriate for providing acceptable service quality under the multi-path environment, and especially, an orthogonal frequency division multiplex (OFDM) method is considered promising. The method is for transmitting a signal using two or more carriers (subcarriers) that are orthogonal to each other, and realizes a communications system that is strong against the influence of multi-path fading.

An outline of OFDM signal transmission and reception follows. First, a sequence of a digital signal (symbol sequence) that expresses information to be transmitted is converted into two or more parallel signal sequences. The number of signal sequences corresponds to the number of subcarriers used by the system. On these parallel signal sequences, a high-speed Inverse Fourier Transform (IFFT: Inverse Fast Fourier Transformation) is performed, and the information of the symbol sequences is given to a subcarrier, namely, the subcarrier is modulated. After the modulation, the parallel signals are again converted into a serial signal, which serial signal is converted into an analog signal by a digital-to-analog converter, and unnecessary RF components are removed by a low pass filter. The signal output from the low pass filter is converted to a radio frequency signal, input into a band pass filter such that unnecessary frequency components are removed, and then, is transmitted from an antenna. On the receiving side, a process that is reverse of the transmitting process is performed. That is, unnecessary components included in the received signal are removed by a band pass filter, and down conversion is performed such that an analog baseband signal is obtained. The analog baseband signal is converted into parallel digital signals by an analog-to-digital converter and a serial-to-parallel converter. To the parallel digital signals, a Fast Fourier Transform (FFT) is performed, and the information borne by each sub-carrier is recovered, namely, demodulated. Henceforth, further processing is performed such that the parallel signals are converted into a serial signal, and the original signal is recovered.

As described above, in an OFDM communications system, the modulation and demodulation of a signal are performed by performing the Inverse Fourier Transform and Fourier Transform, respectively. For this reason, the process of the Fourier transformation must be accurate in order to obtain a satisfactory signal on the receiving side, for which the timing for performing the process must be exact. Detection of suitable timing can be carried out by, for example, obtaining a delay profile of the received signal.

Methods to obtain the delay profile are described as follows. The first method uses autocorrelation of the received signal. This technique is advantageous in that the delay profile can be obtained by a comparatively small-scale operation. However, the delay profile obtained by the autocorrelation changes relatively slowly, and therefore is disadvantageous when highly precise timing detection is required.

The second method is to add a pilot signal to the transmission signal, the pilot signal being known to the transmitting side and the receiving side. The pilot signal after being demodulated (fast-Fourier-transformed) is compared with the known pilot signal on the receiving side, and a channel estimate is calculated. Then, an inverse Fourier transform of the channel estimate is obtained such that the delay profile is obtained. According to this technique, a sharp delay profile is obtained. Further, the processes of the fast Fourier transform, channel estimation, etc., are readily available on the receiving side, therefore, not much has to be added to in order to generate the delay profile. This is an advantage of the second method. Nevertheless, since the delay profile is generated based on the signal after the fast Fourier transform, accuracy of timing detection that is performed based on the delay profile depends on the validity of the fast Fourier transform, which is a disadvantageous concern of this method.

The third method is to obtain the delay profile by obtaining a correlation between the signal acquired by the inverse Fourier transform of the pilot signal, and the received signal (as described by, for example, The Institute of Electronics, Information and Communication Engineers, Ronbunshi B, Vol. J84-B No. 7, pp. 1255–1264, July 2001.) The third method is advantageous in that a sharp delay profile is obtained, and highly precise timing detection can be performed.

Calculation to obtain the correlation value according to the third method is explained with reference to FIG. 1. For simplicity, it is assumed that a transmission signal reaches a receiver through two communication paths (Path 1 and Path 2). Path 1 and Path 2 in FIG. 1 represent two signal sequences that are included in the received signal. Path 2 reaches the receiver L samples after Path 1, which is the main signal, as illustrated. An OFDM symbol section of the signal is constituted by a guard interval portion consisting of $N_{GI}$ samples, and a signal portion consisting of N samples. Although the signals Path 1 and Path 2 are separately drawn for convenience of explanation, it should be noted that the actual signal received is a mixture of the two signals.

From the received signal, 2N samples ($r_0, r_1, r_2, \ldots, r_{2N-1}$) are taken from the timing position of FFT into a buffer, where N is an FFT size. Then, a correlation value is calculated, the correlation being between N samples of the taken-in 2N samples of the received signal, and N samples of the known pilot signal after the inverse Fourier transform, the latter being called "pilot replica". The correlation value is calculated for k=1 through k=N−1, where k is the number of samples that represents the phase difference between the received signal and the pilot replica, and k is simply called the phase difference k hereafter. That is, a section for the correlation calculation (a section, samples within which are multiplied, and a total of multiplication is obtained) is shifted according to the value of the phase difference k. Specifically, when the phase difference k is equal to zero, samples from $r_0$ to $r_{N-1}$ are used. When the phase difference k is equal to one, samples from $r_1$ to $r_N$ are used. When the phase difference k is equal to L, the samples from $r_L$ to $r_{N-1+L}$ are used. When the phase difference k is equal to N−1, samples from $r_{N-1}$ to $r_{2N-2}$ are used. The same is said of other phase differences.

Out of the correlation values acquired as the phase difference k is shifted from 0 to N−1, a correlation value that has the same timing as Path 1 contributes to enlarging the peak of Path 1 in the delay profile. In the example illustrated in FIG. 1, the correlation value corresponding to the phase difference k=0 is this case. Further, a correlation value that has the same timing as Path 2 contributes to enlarging the peak of Path 2 in the delay profile. In the illustrated example, the correlation value corresponding to the phase difference k=L is this case. Other correlation values of other phase differences serve as an interference component (noise) in the delay profile. The interference component contains an interference component produced within the same symbol, and an interference component between adjacent symbols (adjacent symbol interference). Although the former serves as zero or a negligible value, the latter cannot be disregarded. That is, in the case of the delay profile generated based on the correlation values, the adjacent symbol interference can disturb accurate detection of the timing of the paths.

THE INDICATION OF INVENTION

The present invention aims at offering a delay profile estimation apparatus and a correlating unit that generate a delay profile with a suppressed amount of noise. The objective is achieved as follows.

The delay profile estimation apparatus according to the present invention includes:

a receiving unit configured to receive a communication signal (received signal), a conversion unit configured to carry out an inverse Fourier transform of a known pilot signal that consists of N samples, a correlating unit connected to the receiving unit and the conversion unit, and configured to calculate a value of correlation between the known pilot signal that is inverse Fourier transformed and the received signal, and a delay profile acquisition unit connected to the correlating unit, and configured to obtain a delay profile of the received signal based on the value of correlation, wherein the correlating unit calculates the value of correlation corresponding to a phase difference between the communication signal and the inverse Fourier transformed pilot signal while cyclically shifting either N samples of the received signals or the known pilot signal.

DESCRIPTION OF THE PREFERRED EMBODIMENTS

[The First Embodiment]

Figure 1:
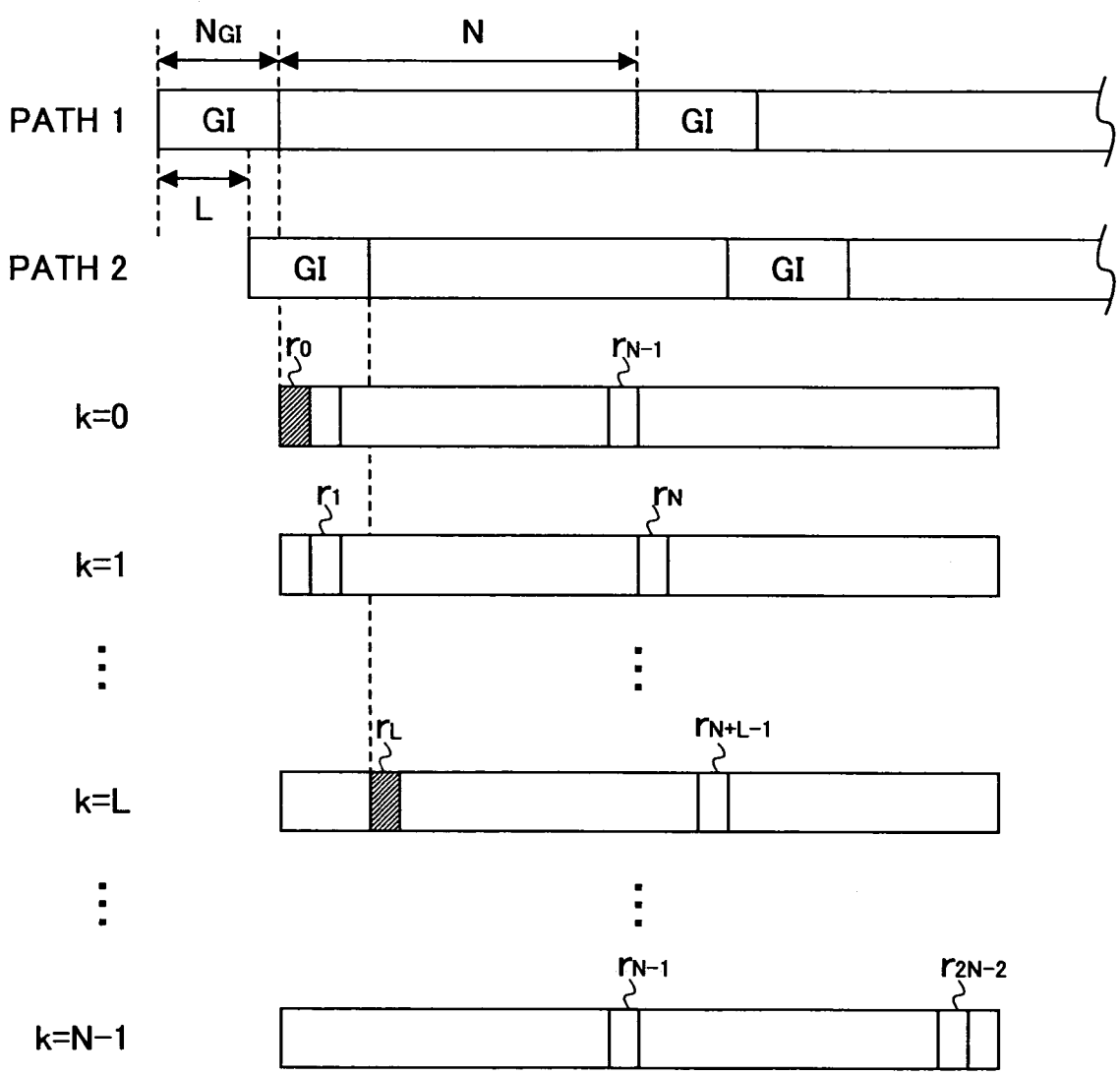
FIG. 1 is a timing chart showing path signals and phase differences for explaining a conventional correlation calculation.
Figure 2:
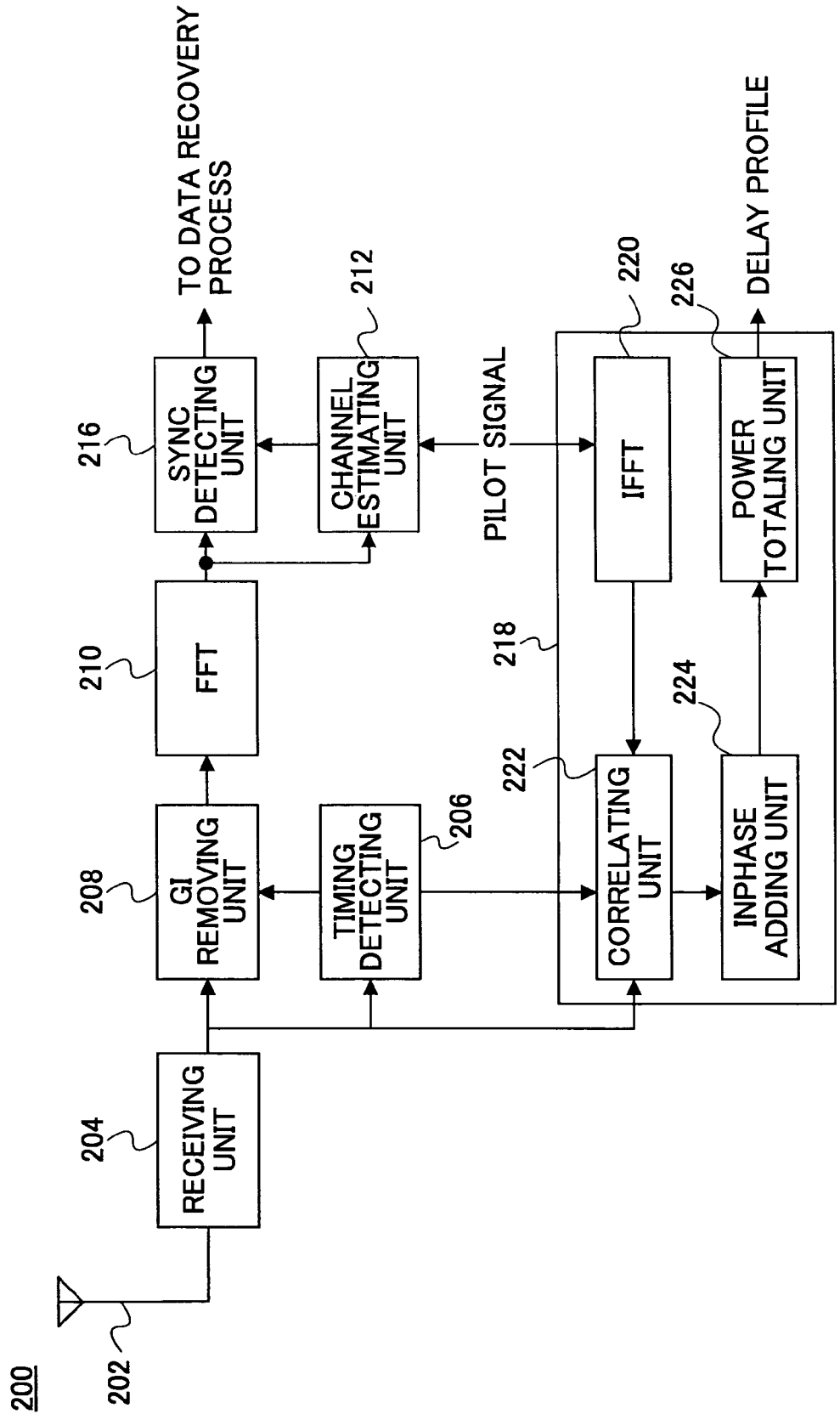
FIG. 2 is a block diagrams of a receiving apparatus to which the present invention is applicable.

FIG. 2 is a block diagram of a receiving apparatus 200 for OFDM communications, to which receiving apparatus the present invention is applied. The receiving apparatus 200 includes a receiving unit 204 that is connected to an antenna 202 for receiving an OFDM signal (received signal). The receiving unit 204 carries out processes of removing an unnecessary wave by a band pass filter (BPF), frequency converting the received signal to a baseband signal, converting to a digital signal from an analog signal, converting from a serial signal to a parallel signal, etc. The output of the receiving unit 204 is provided to a timing detecting unit 206 that is configured to detect the timing for performing a fast Fourier transform. The timing detecting unit 206 detects the timing based on, for example, autocorrelation of the received signal provided by the receiving unit 204. Although the timing acquired by this technique is not highly precise, precision degradation can be avoided by using a result of exact timing detection based on a delay profile as described below.

The output of the receiving unit 204 is also provided to a GI removal unit 208 configured to remove a guard interval contained in the received signal using the timing information provided by the timing detecting unit 206. The GI removal unit 208 removes a portion, the portion corresponding to the guard interval, from the received signal. To the output of the GI removal unit 208, an FFT unit 210 configured to perform a fast Fourier transform is connected. As described above, the received OFDM signal is demodulated by carrying out Fourier transform. The demodulated signal of each subcarrier is provided to a channel estimating unit 212. The channel estimating unit 212 detects the influence of fading in the propagation path for every subcarrier of the received signal based on the demodulated signal, and the pilot signal known to the transmitting side and the receiving side.

The channel estimating unit 212 provides amplitude information and phase information to a sync detecting unit 216 configured to compensate for distortion based on the amplitude information and phase information. The sync detecting unit 216 is connected to the output of the FFT unit 210. An output signal of the sync detecting unit 216 is connected to a downstream processing unit (not shown) configured to restore the original data.

Further, a delay profile estimation unit 218 configured to acquire the delay profile of the received signal is connected to the receiving unit 204. The delay profile estimation unit 218 includes an IFFT unit 220 configured to carry out the inverse fast Fourier transform of the known pilot signal. The delay profile estimation unit 218 further includes a correlating unit 222 configured to calculate a value of the correlation between the received signal provided by the receiving unit 204 and the pilot replica, which is an inverse-Fourier-transformed pilot signal. When calculating the correlation value, the timing detected by the timing detecting unit 206 is used. An inphase adding unit 224 configured to carry out inphase addition of the correlation values is connected to the output of the correlating unit 222. The inphase adding unit 224 carries out addition of each of inphase components (I)

and orthogonal components (Q). A power totaling unit 226 configured to calculate power is connected to the output of the inphase adding unit 224, and the power totaling unit 226 outputs a delay profile.

The correlating unit 222 calculates the correlation value (corr) based on the following formula, $$corr(k) = \frac{1}{N} \sum_{j=0}^{N-1} p_j^* \cdot r_{(j+k) \bmod N}$$

$$(k = 0, 1, \ldots, N-1)$$

where $p_j$ represents the component of the pilot replica (which is the inverse-Fourier-transformed pilot signal) that consists of N samples, k represents the number of samples representing the phase difference between the received signal and the pilot replica, $r_m$ represents an m-th component of the received signal (m=0, 1 and 2, ..., N−1), mod expresses a remainder operator, and

* denotes a complex conjugate.

Specifically, in the case of the phase difference k=0, when j is shifted from 0 to N−1, (j=0, 1 and 2, ..., N−1), j+k changes from 0 to N−1 (j+k=0, 1 and 2, ..., N−1). Further, (j+k)modN changes from 0 to N−1 ((j+k)modN=0, 1 and 2, ..., N−1). Accordingly, a component $p^*_0$ of the pilot replica is multiplied by a sample $r_0$ of the received signal, and similarly, $p^*_{N-1}$ is multiplied by $r_{N-1}$. Then, products of the multiplication are totaled. The total in the case of k=0 is the same as the case of k=0 in the conventional method.

In the case of the phase difference k=1 for j=0, 1 and 2, ..., N−1, j+k=1, 2, ..., N−1, N, and (j+k)modN=1, 2, ..., N−1 and 0.

Accordingly, the component $p^*_0$ of the pilot replica is multiplied by the sample $r_1$ of the received signal, $p^*_{N-2}$ is multiplied by $r_{N-1}$, $p^*_{N-1}$ is multiplied by $r_0$, and the products are totaled. Here, it should be noted that the product of $p^*_{N-1}$ and $r_0$ is calculated instead of $p^*_{N-1}$ and $r_N$, which is a conventional method.

In the case of the phase difference k=2 for j=0, 1 and 2, ..., N−1 j+k=2, 3, ..., N, and N+1, and (j+k)modN=2, 3, ..., N−1, 0 and 1.

Accordingly, to each of the components $p^*_0$ through $p^*_{N-1}$ of the pilot replica, each of the samples $r_2, r_{N-1}, r_0$ and $r_1$ of the received signal are respectively multiplied, and the total of the products is calculated. Here, it should be noted that the product of $p^*_{N-2}$ and $r_0$, and the product of $p^*_{N-1}$ and $r_1$ are calculated according to the present invention, which compares with the conventional method using products of $p^*_{N-2} \times r_N$ and $p^*_{N-1} \times r_{N+1}$. According to the present invention, correlation values are calculated by cyclically shifting $r_m$ of the N samples of the received signal.

Figure 3:
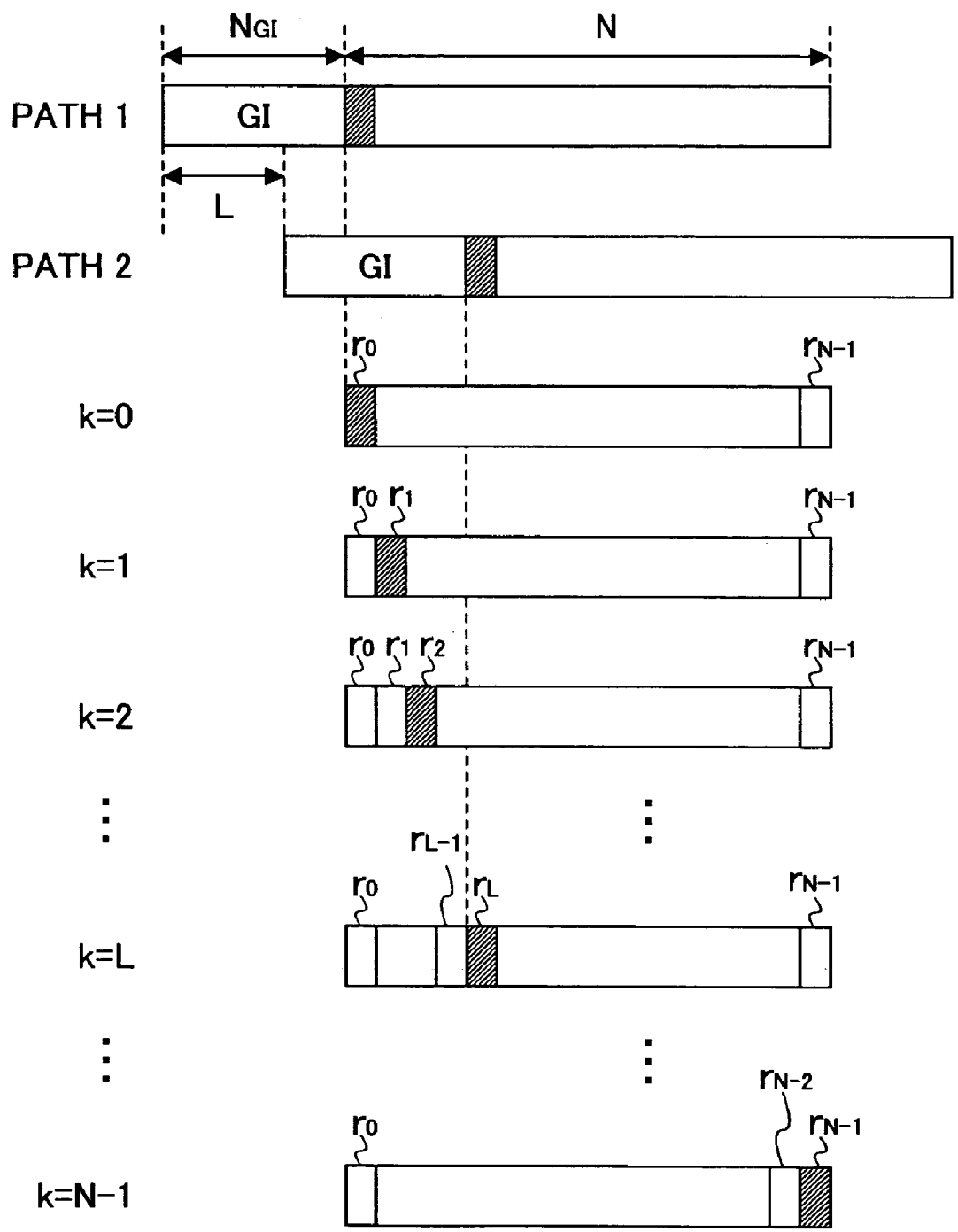
FIG. 3 is a timing chart showing path signals and phase differences for explaining a correlation calculation according to the first embodiment of the present invention.

FIG. 3 is a timing chart for explaining the correlation calculation performed according to the above-mentioned formula. The received signal includes two signal sequences Path 1 and Path 2. In comparison with Path 1, which is the main signal, Path 2 is received with a delay equivalent to L samples as illustrated. The signal consists of OFDM symbol sections, each of which consists of a guard interval section made of $N_{GI}$ samples and a signal portion made of N samples. For convenience of explanation, Path 1 and the Path 2 are separately drawn; nevertheless, the actual signal received is a mixture of the signals Path 1 and Path 2.

Starting at a timing position of FFT, not 2N, but N samples ($r_0, r_1, r_2, \ldots, r_{N-1}$) of the received signal are taken into a buffer. Correlation values are obtained by multiplying the pilot replica ($p_0, p_1, p_2, \ldots, p_{N-1}$), which consists of N samples, and the N samples of the taken-in received signal, respectively. The calculation is performed for the phase difference k shifted from 0 to N−1, the phase difference being between the received signal and the pilot replica.

A section (section for calculating a total of the products of the samples), of which correlation calculation is to be performed, is shifted cyclically by shifting the value of the phase difference k. According to the present invention, the N samples are cyclically shifted, which is different from the conventional shifting method. That is, when the phase difference k is equal to zero, the samples from $r_0$ to $r_{N-1}$ are used in order. When the phase difference k is equal to one, the samples from $r_1$ to $r_{N-1}$ are used in order, and then the sample $r_0$ is used. When the phase difference k is equal to two, the samples from $r_2$ to $r_{N-1}$ are used in order, and then the samples $r_0$ and $r_1$ are used in order. When the phase difference k is equal to L, the samples from $r_L$ to $r_{N-1}$ are used in order, and then the samples from $r_0$ to $r_{L-1}$ are used in order. Finally, when the phase difference k is equal to N−1, the sample $r_{N-1}$ is used, and then the samples from $r_0$ to $r_{N-2}$ are used in order. In this manner, the correlation values are calculated by cyclically shifting the N samples $r_0$ through $r_{N-1}$, and by totaling products obtained by multiplying the samples by the respective samples of the pilot replica.

Next, the validity of the correlation values calculated as above is explained. Out of the correlation values obtained by changing the phase difference k from 0 to N−1, a correlation value, timing of which matches with Path 1 contributes to enlarging the peak of Path 1 in the delay profile. In the illustrated example, the correlation value corresponding to the phase difference k=0 is this case.

A correlation value, timing of which matches with Path 2 contributes to enlarging the peak of Path 2 in the delay profile. In the illustrated example, the correlation value corresponding to the phase difference k=L is this case. This can be explained as follows. To the guard interval GI of an OFDM signal, a later portion of the OFDM signal is copied. Out of the N samples stored in the buffer, the samples $r_0$ through $r_{L-1}$ include the 0th through the (L−1)th signal components, respectively, of Path 1, and in addition, the signal component contained in the guard interval of Path 2 is also contained. Generally, the guard interval of an OFDM signal contains the same contents as the sample from (N−$N_{GI}$)th to the (N−1)th of the N samples that follow the guard interval. For this reason, the guard interval of Path 2 also contains L samples, namely, the (N−L)th through the (N−1)th samples, of Path 2. Therefore, if attention is paid to Path 2, using the samples $r_L$ through $r_{N-1}$ in order, and then the samples $r_0$ through $r_{N-1}$ in order, is equivalent to using the samples $r_0$ through $r_{N-L-1}$ in order and then using the samples $r_{N-L}$ through $r_{N-1}$ in order. Accordingly, the correlation value calculated about the phase difference L turns into a correlation value calculated corresponding to the timing of Path 2 that is delayed by L in comparison with Path 1.

The correlation values about the other phase differences (i.e., other than the cases where k is 0, or L) serve as interference components (noise) in the delay profile. However, as shown in FIG. 3, the interference component generated in the case of the embodiment is that of the same symbol, rather than that of adjacent symbols, given that the amount of delay is supposed to be within the guard interval GI (L<=$N_{GI}$) in the present embodiment. Therefore, the interference level that shows up in the delay profile is sufficiently suppressed.

The correlation values acquired as mentioned above are added by the inphase adding unit 224 separately for the inphase components (I) and the orthogonal components (Q). Added results are converted into power units by the power totaling unit 226, and the delay profile is obtained. Since the delay profile represents instant values, a more precise delay profile is obtained by taking an average over a period, during which period the property of the communication path is constant.

Figure 4:
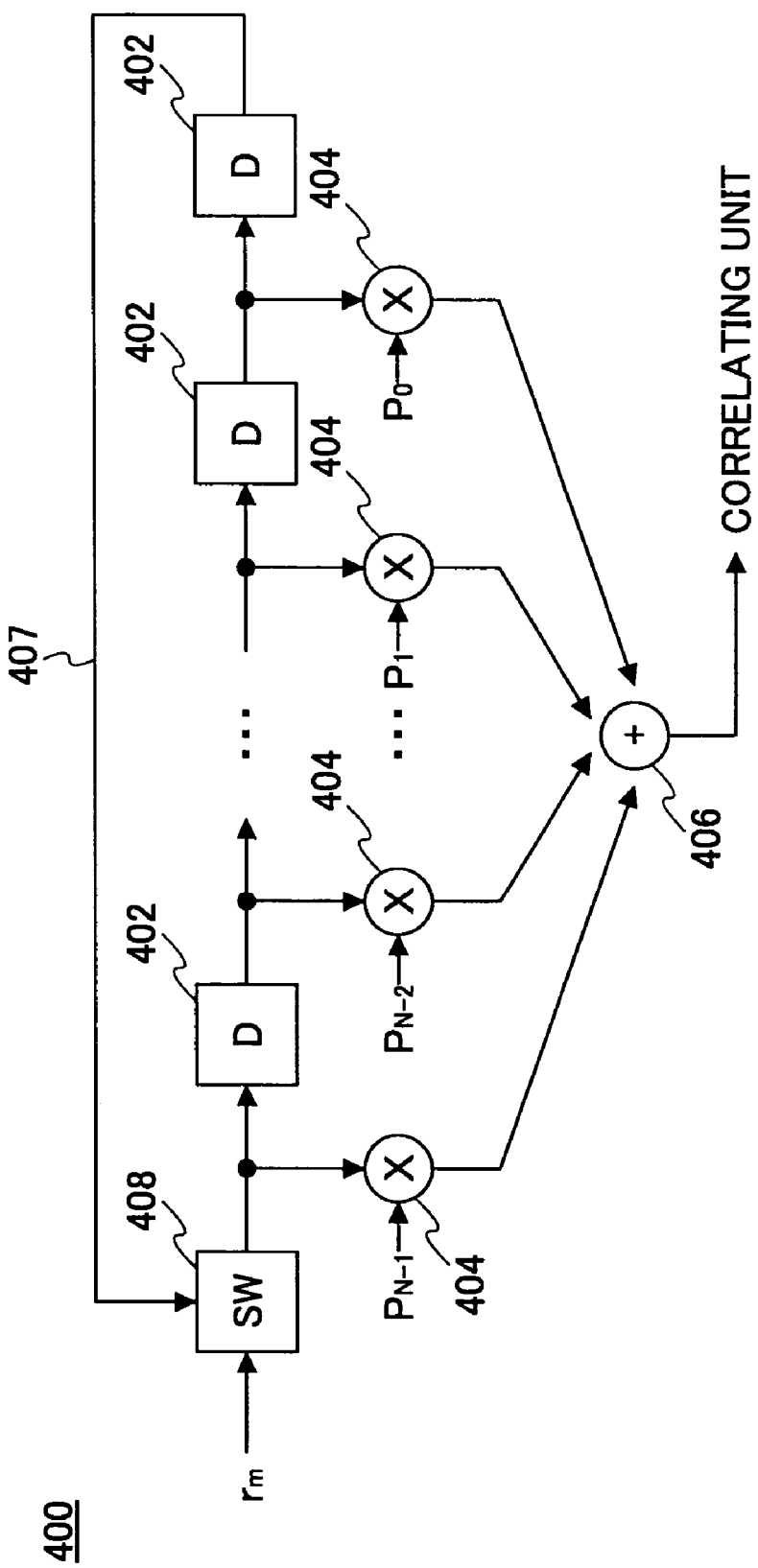
FIG. 4 is a block diagram of a correlating unit according to the first embodiment of the present invention.

FIG. 4 is a block diagram of a correlating unit 400 configured to perform correlation calculations according to the embodiment of the present invention. The correlating unit 400 includes two or more delay units 402 connected in series, and configured to output N signals with delay amounts equivalent to 0 through N−1 samples to an input signal $r_m$. Each delay unit 402 can be formed by a shift register, for example. The correlating unit 400 further includes two or more multipliers 404 for calculating products of an input signal to each delay unit 402 and a respective component of the pilot replica. All the outputs of the multipliers 404 are provided to an adder 406. The adder 406 outputs a correlation value. Further, the correlating unit 400 includes a switch 408 that selects one of a delay signal acquired through the feedback line 407 and a new received signal $r_m$ as the signal to be provided to the delay units 402. The switch 408 selects the delay signal acquired through the feedback line 407 until N correlation values are obtained by shifting the phase difference k from 0 thorough N−1, the phase difference being between the received signal and the pilot replica. In this manner, the samples stored in each delay unit 402 are cyclically shifted.

[The 2nd Embodiment]

In the first embodiment, it is assumed that the amount of delay between the paths (the delay amount L of Path 2 in reference to Path 1 in the illustrated example in FIG. 3) is within the range of the guard interval $N_{GI}$. In this case, when the phase difference between the received signal and the pilot replica is L, the peak of Path 2 is enlarged in the delay profile. To each of the pilot replica components $p^*_0$ through $p^*_{N-1}$, each of the samples $r_L$ through $r_{N-1}$ and $r_0$ through $r_{L-1}$ of the received signal are respectively multiplied; and products of the multiplication are totaled to obtain the correlation value.

Figure 5:
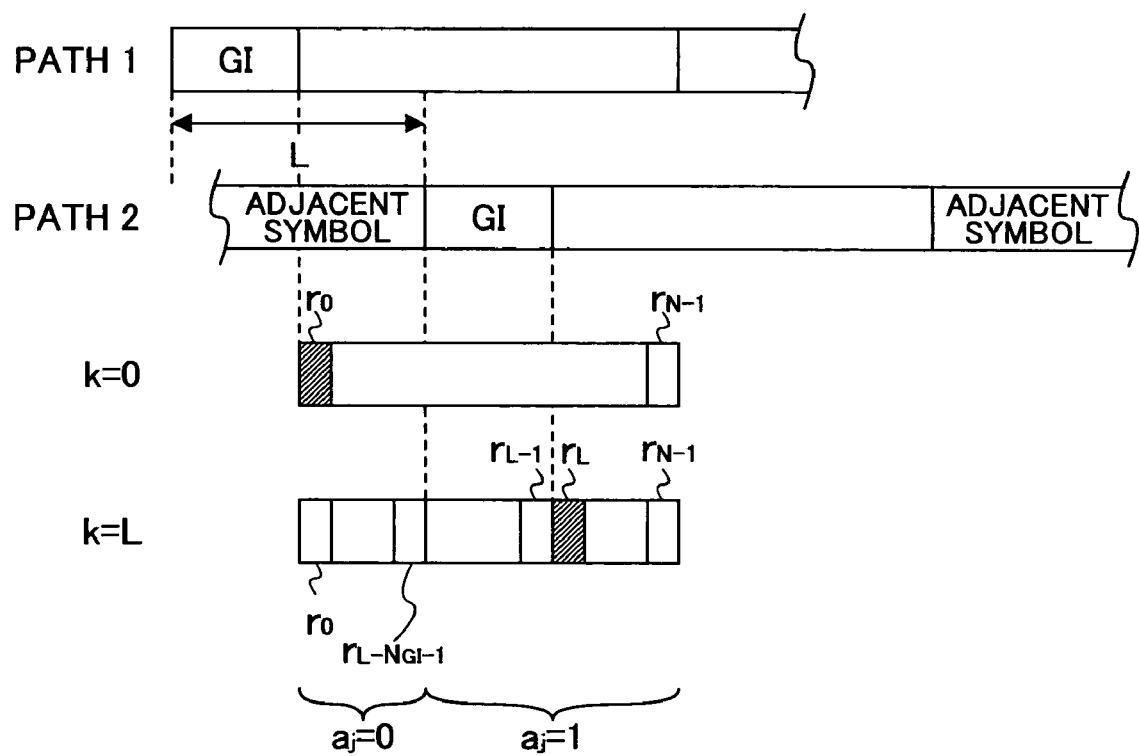
FIG. 5 is a timing chart showing path signals and phase differences for explaining the correlation calculation according to the second embodiment of the present invention.

However, there are cases where Path 2 arrives after the guard interval. As shown in FIG. 5, the 0th through the (L−$N_{GI}$−1)th samples out of the 0th through the (L−1)th samples (i.e., $r_0$ through $r_{L-1}$) of the received signal stored in the buffer contain components of the adjacent symbols of Path 2. For this reason, if the correlation value is calculated as in the first embodiment, an interference component due to the adjacent symbols (adjacent symbol interference) arises in the delay profile. Accordingly, the second embodiment of the present invention aims at suppressing the noise in the delay profile, even if the received signal contains a path having a delay amount exceeding the guard interval.

According to the present embodiment, the correlation value is calculated by assigning weights to samples that cause the interference due to adjacent symbols out of the samples of the received signal such that the interference is suppressed in calculating the correlation value. Specifically, when the samples $r_L$ through $r_{N-1}$ and $r_0$ through $r_{L-1}$ of the received signal are multiplied by the pilot replica components $p^*_0$ through $p^*_{N-1}$, respectively, and the products thereof are totaled, L−$N_{GI}$ samples, namely from the 0th sample through (L−$N_{GI}$−1)th sample, of the samples of the received signal are made not to contribute to the total. Specifically, the correlation value (corr) is obtained by the following formula, $$corr(k) = \frac{1}{Ncorr(k)} \sum_{j=0}^{N-1} a_j \cdot p^*_j \cdot r_{(j+k) \bmod N}$$

$$(k = 0, 1, 2, \ldots, N-1)$$

where, $a_j$ is a weighting factor which takes value 0 at the time of j=N−k, . . . , N−k−L−$N_{GI}$−1, and takes value 1 in other cases. As for $p_j$, $r_m$, mod, and *, they are the same as above. Ncorr(k) represents a quantity corresponding to the samples that are not disregarded out of the N samples of the received signal. In addition, the samples from the Lth to the (N−1)th, and the samples from (L−$N_{GI}$)th to the (L−1)th among the samples of the received signal contribute to enlarging the peak of Path L.

Further, another conceivable case is that there is a delayed signal Path 2; however, the amount of the delay L is unknown. In this case, the 0th through (k−1)th samples of the received signal are excluded from the correlation calculation. Here, k is the number of samples equivalent to the phase difference between the received signal and pilot replica, the sample of the received signal being shifted in the correlation calculation. In this case, the weight factor $a_j$ is set to 0 when j=N−k, . . . , N−1; and in other cases, $a_j$ is set to 1. When the correlation calculation is carried out in this way, not only the samples that actually cause adjacent symbol interference, but also the samples that do not cause the adjacent symbol interference may be disregarded. However, the samples that may cause the adjacent symbol interference are surely excluded, and the delay profile is not affected by the adjacent symbol interference.

Thus, when the received signal contains a path signal that arrives after the guard interval, samples that are considered likely to cause the adjacent symbol interference are excluded from the correlation calculation such that the noise in the delay profile is suppressed.

Figure 6:
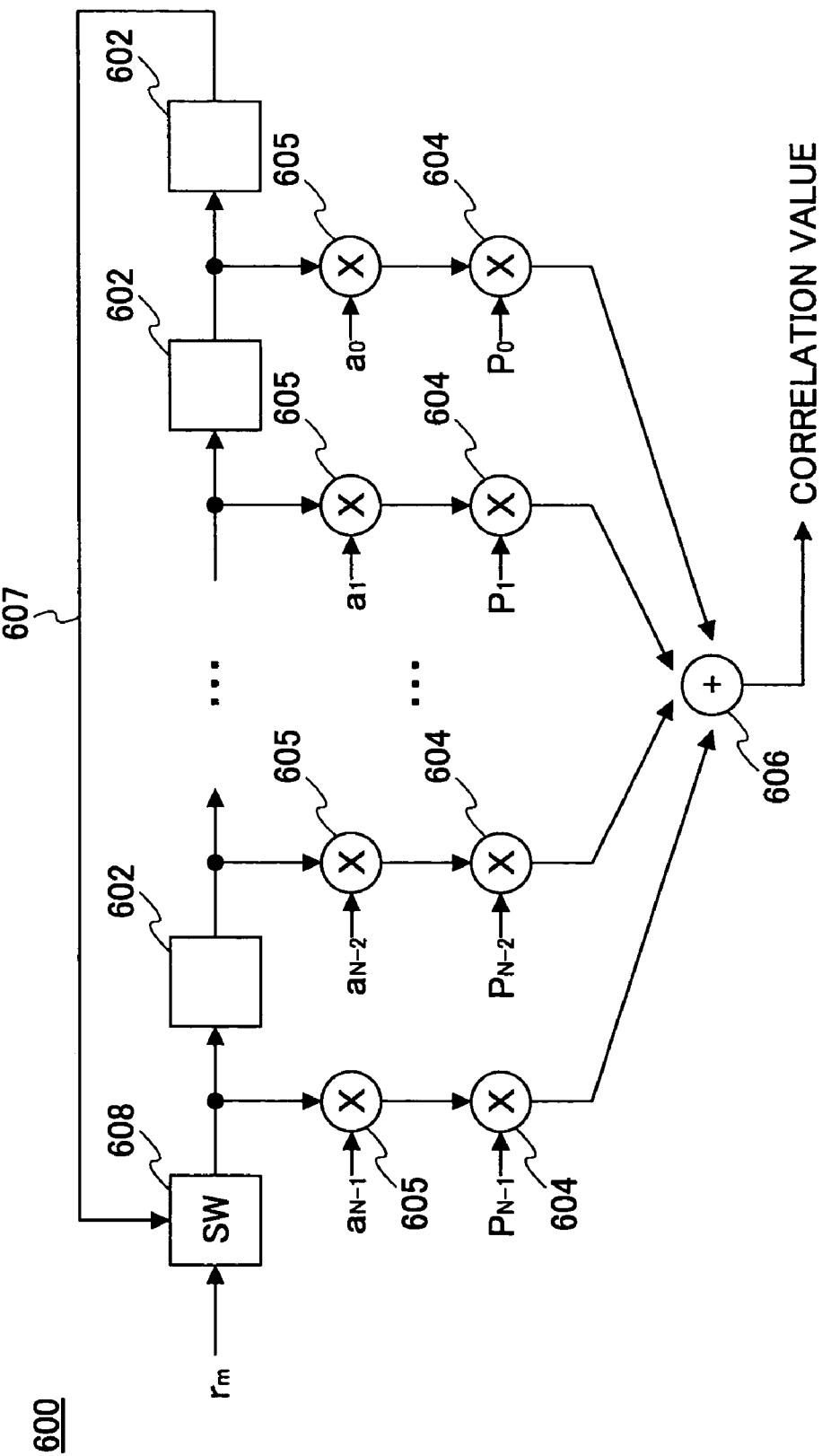
FIG. 6 is a block diagram of the correlating unit according to the second embodiment of the present invention.

FIG. 6 is a block diagram of a correlating unit 600 configured to calculate the correlation value according to the present embodiment. The correlating unit 600 includes two or more delay units 602 connected in series, and configured to take in an input signal $r_m$, and to output N delay signals, the delay amount of which ranges from 0 to N−1 samples. Each delay unit 602 can be formed by a shift register. The correlating unit 600 further includes two or more multipliers 605 for multiplying the signal input to each delay unit 602 and the respective weighting factor $a_j$ that takes a value of 0 or 1. The correlating unit 600 further includes two or more multipliers 604 for multiplying the weighted signal input to each delay unit 602 and the component of the known pilot replica. All the outputs of the multipliers 604 are input to an adder 606. The adder 606 outputs a correlation value. Further, the correlating unit 600 includes a switch 608 that selects one of a delay signal acquired through a delay line 607 and a newly received signal $r_m$ as an input signal to the delay units 602. The switch 608 selects the delay signal acquired through the delay line 607 until N correlation values are obtained by shifting the phase difference k between the received signal and the pilot replica from 0 to N−1. In this manner, the samples stored in the delay units 602 are cyclically shifted.

As described above, according to the embodiment of the present invention, the correlation value is calculated according to the phase difference between the received signal and the pilot replica while cyclically shifting the N samples of the received signal such that the influence from the noise on the delay profile, especially adjacent symbol interference, will be suppressed. When there is a path that arrives after the guard interval, adjacent symbol interference is prevented from entering into the delay profile by excluding samples that are likely to cause the adjacent symbol interference from the correlation calculation.

In describing the present invention, the N samples $r_m$ ($0<=m<=N-1$) of the received signals are described as being cyclically shifted when calculating the correlation value with the N pilot replicas $p_j$ being fixed. This is not essential to the present invention. Rather, the samples of the received signal can be fixed, and the samples of the pilot replica are cyclically shifted. Moreover, although the present invention is explained where two paths (Path 1 and Path 2) are present, this is for explanation purposes only, and the present invention is applicable to cases where more than two paths are present.

Further, the present invention is not limited to these embodiments, but variations and modifications may be made without departing from the scope of the present invention.

What is claimed is:

1. A delay profile estimation apparatus, comprising:
   a receiving unit configured to receive a communication signal;
   a conversion unit configured to subject a known pilot signal that is made up of N samples to an inverse Fourier transform;
   a correlating unit, coupled to said receiving unit and said conversion unit, configured to calculate a correlation value between the communication signal and the known pilot signal that has been subjected to the inverse Fourier transform; and
   a delay profile generating unit, coupled to said correlating unit, configured to generate a delay profile of the communication signal based on the correlation value,
   wherein said correlating unit cyclically shifts the communication signal or the known pilot signal that has been subjected to the inverse Fourier transform and amounts to N samples, and calculates the correlation value corresponding to a phase difference between the communication signal and the known pilot signal that has been subjected to the inverse Fourier transform.

2. The delay profile estimation apparatus as claimed in claim 1, wherein the correlating unit comprises:
   a plurality of delay units coupled in series and configured to output N delay signals that have been delayed by a predetermined number of samples with respect to an input signal;
   a product summation unit configured to obtain a total of products of the N delay signals and the known pilot signal that is made up of the N samples and has been subjected to the inverse Fourier transform; and
   a switching unit configured to select one of the delay signals provided by one of the delay units as the input signal at least until a predetermined number of correlation values is calculated.

3. The delay profile estimation apparatus as claimed in claim 1, wherein the correlation value (corr) is calculated according to the following formula, $$corr(k) = \frac{1}{N}\sum_{j=0}^{N-1} p_j^* \cdot r_{(j+k) \bmod N}$$

$$(k = 0, 1, \ldots, N-1)$$

where k represents a number of samples corresponding to the phase difference between the communication signal and the known pilot signal that has been subjected to the inverse Fourier transform,
$p_j$ represents a component of the known pilot signal that has been subjected to the inverse Fourier transform,
$r_m$ represents a component of the communication signal,
mod represents a remainder operator, and
* represents a complex conjugate.

4. The delay profile estimation apparatus as claimed in claim 1, wherein the communication signal is an orthogonal frequency division multiplexed (OFDM) signal.

5. The delay profile estimation apparatus as claimed in claim 4, wherein the correlation value is calculated by excluding certain samples of the communication signal that are determined to likely cause adjacent symbol interference when the communication signal includes a path signal that arrives after a guard interval.

6. A correlating unit that is to be used in estimating a delay profile of a received signal, and configured to calculate a correlation value between the received signal and N samples of a known pilot signal that has been subjected to an inverse Fourier transform, wherein the correlation value corresponding to a phase difference between the communication signal and the known pilot signal that has been subjected to the inverse Fourier transform is calculated by cyclically shifting the communication signal or the known pilot signal that has been subjected to the inverse Fourier transform and amounts to N samples.

7. The correlating unit as claimed in claim 6, further comprising:
   a plurality of delay units coupled in series and configured to output N delay signals that have been delayed by a predetermined number of samples with respect to an input signal,
   a product summation unit configured to obtain a total of products of the N delay signals and the known pilot signal that is made up of the N samples and has been subjected to the inverse Fourier transform, and
   a switching unit configured to select one of the delay signals provided by one of the delay units as the input signal at least until a predetermined number of the correlation values is calculated.

8. The correlating unit as claimed in claim 6, wherein the correlation value (corr) is calculated according the following formula, $$corr(k) = \frac{1}{N}\sum_{j=0}^{N-1} p_j^* \cdot r_{(j+k) \bmod N}$$

$$(k = 0, 1, \ldots, N-1)$$

where k represents a number of samples corresponding to the phase difference between the received signal and the known pilot signal that has been subjected to the inverse Fourier transform, $p_j$ represents a component of the known pilot signal that has been subjected to the inverse Fourier transform, $r_m$ represents a component of the received signal, mod represents a remainder operator, and

* represents a complex conjugate.

9. The correlating unit as claimed in claim 6, wherein the communication signal is an orthogonal frequency division multiplexed (OFDM) signal.

10. The correlating unit as claimed in claim 6, wherein the correlation value is calculated by excluding certain samples of the received signal that are determined to likely cause adjacent symbol interference when the received signal includes a path signal that arrives after a guard interval.

11. A method of estimating a delay profile for a communication apparatus, comprising:

receiving a communication signal;

subjecting a known pilot signal that is made up of N samples to an inverse Fourier transform;

calculating a correlation value between the communication signal and the known pilot signal that has been subjected to the inverse Fourier transform;

generating a delay profile of the communication signal based on the correlation value; and cyclically shifting the communication signal or the known pilot signal that has been subjected to the inverse Fourier transform and amounts to N samples, and calculating the correlation value corresponding to a phase difference between the communication signal and the known pilot signal that has been subjected to the inverse Fourier transform.

* * * * *